Figure 1:
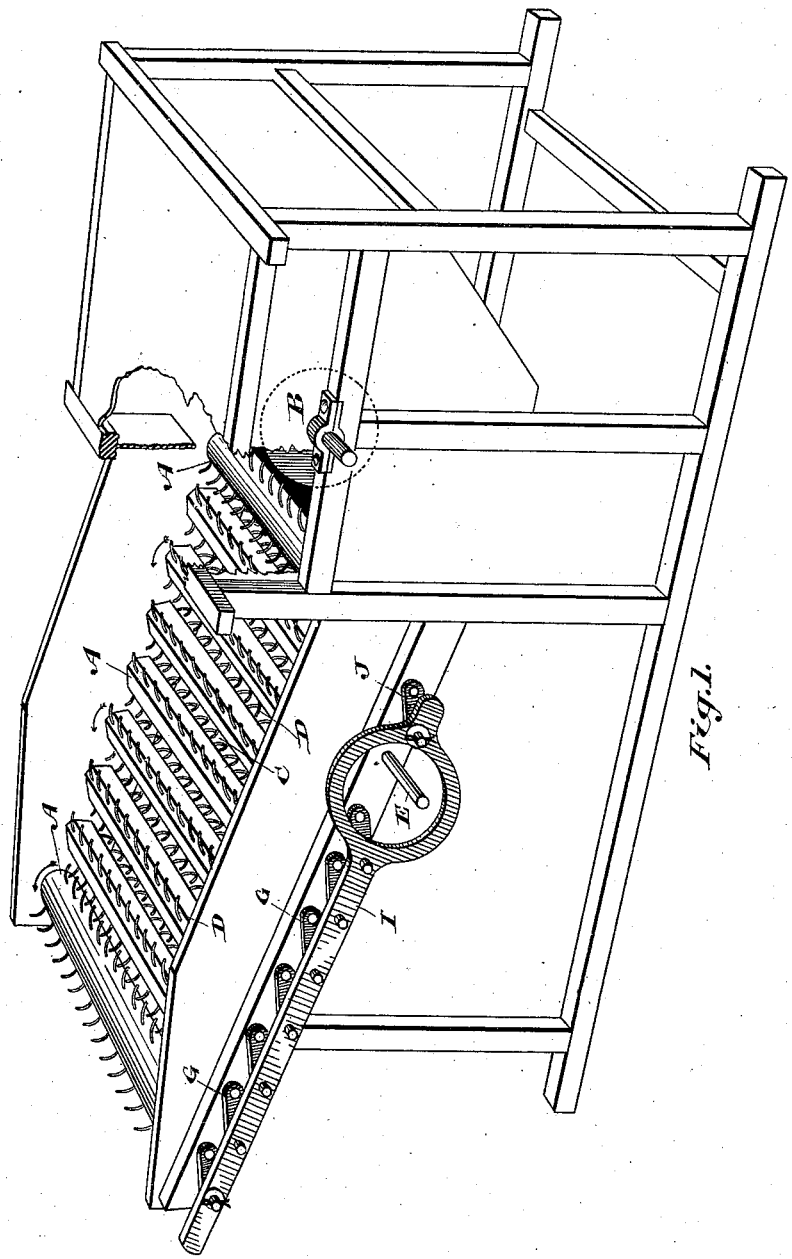

(No Model.) 3 Sheets—Sheet 1.

W. MOGRIDGE. & W. GIBERSON.
THRASHING MACHINE.

No. 365,620. Patented June 28, 1887.

Witnesses.
F. B. Fetherstonhaugh
J. M. Jackson

Inventors.
Wm Mogridge
Wm Giberson
by Donald C. Ridout & Co
Attys

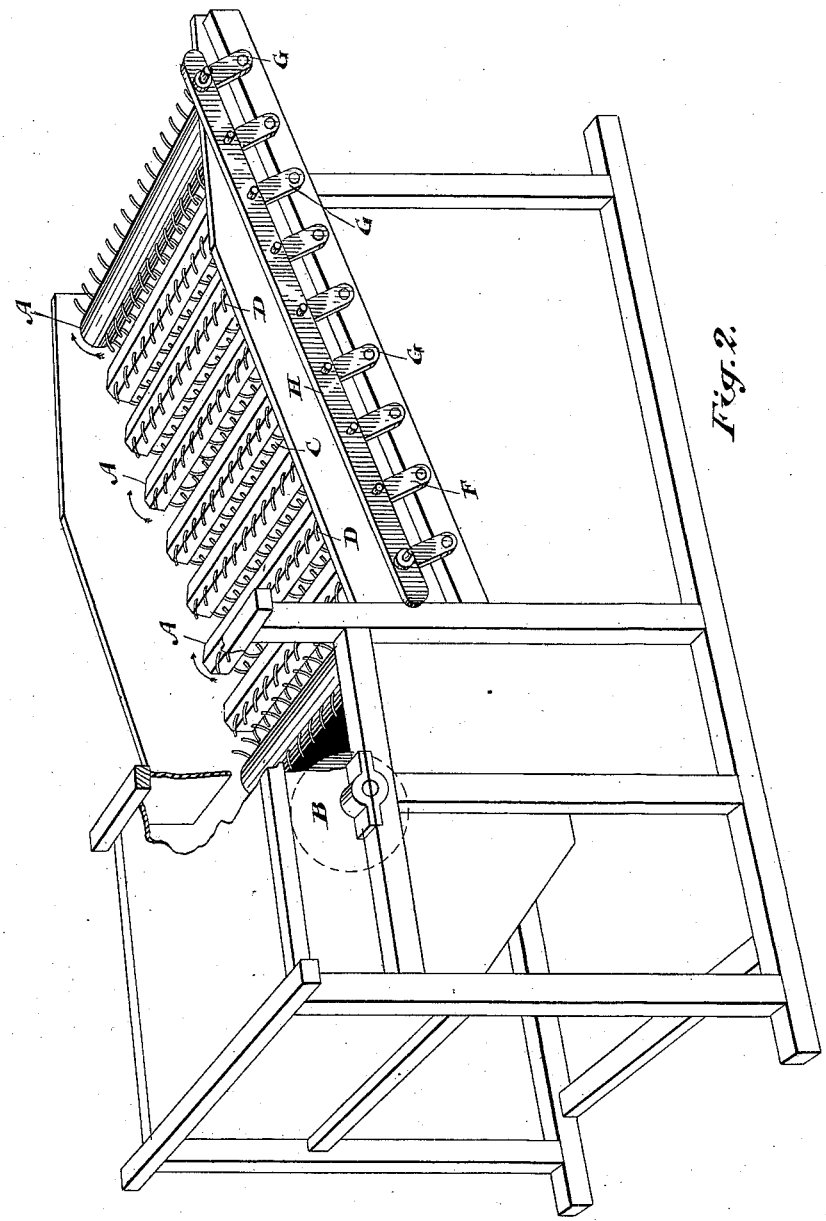

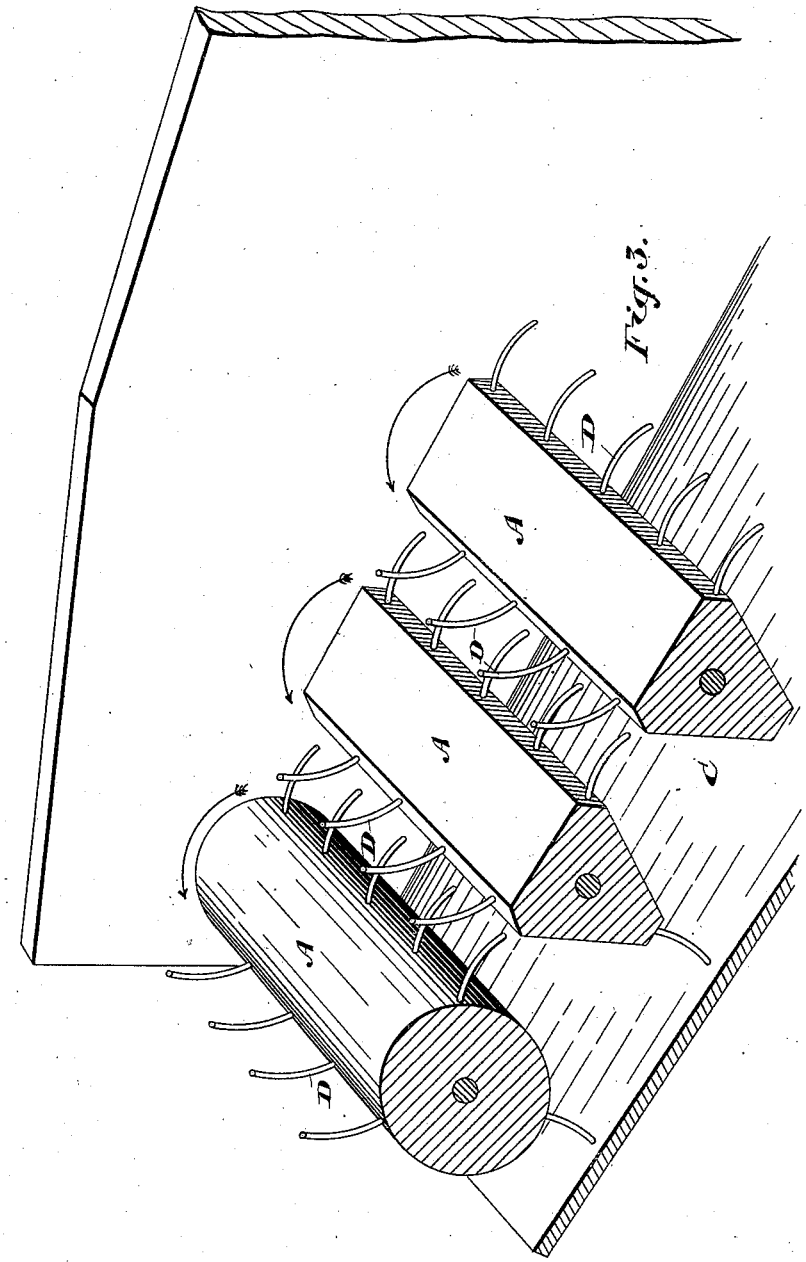

UNITED STATES PATENT OFFICE.

WILLIAM MOGRIDGE AND WILLIAM GIBERSON, OF BRAMPTON, ONTARIO, CANADA.

THRASHING-MACHINE.

SPECIFICATION forming part of Letters Patent No. 365,620, dated June 28, 1887.

Application filed November 18, 1886. Serial No. 219,290. (No model.)

*To all whom it may concern:*

Be it known that we, WILLIAM MOGRIDGE and WILLIAM GIBERSON, both of the town of Brampton, in the county of Peel, in the Province of Ontario, Canada, have jointly invented certain new and useful Improvements in Thrashing-Machines, of which the following is a specification.

This invention relates to thrashing-machines; and it consists in the peculiar combinations and the construction, arrangement, and adaptation of parts, all as more fully hereinafter described and claimed.

Figure 1 is a perspective side elevation of a portion of a thrashing-machine, showing the location and arrangement of our elevating-deck. Fig. 2 is a similar view from the opposite side of the machine. Fig. 3 is an enlarged detail of the rollers.

In the drawings, A represents a series of rollers suitably journaled in the frame of the thrashing-machine on the same line upon which the ordinary straw-deck is located. The roller nearest to the thrashing-cylinder B and the roller at the opposite end of the deck are shown round in the drawings; but it is not absolutely necessary that they should be so shaped, although we find that they operate better when so formed. The other rollers, it will be noticed, are flattened in the manner indicated, which we find to be the best form, as the grain shaken out of the straw passing over them will slide more freely off them onto the deck C, where it is conveyed into the grain-receptacle. The triangular shape of these rollers also causes them to act as a series of beaters against the bottom surface of the straw. The spring-fingers D, which are attached to and revolve with the rollers A, enter into the body of the straw and effectually shake up all parts of it and free any grain which may be carried in the straw. These fingers also prevent the grain from wrapping around the rollers A, as will be understood on reference to Fig. 3. As the rollers A revolve in the direction indicated by arrows, so as to elevate the straw from the cylinder B to the top end of the machine, where it is discharged onto the straw-elevator, the fingers D enter the straw on the low or cylinder side of the rollers and are withdrawn from the straw on the opposite side of the said rollers. As straw would naturally cling to the fingers, the rollers A would be soon bound up with straw were it not for the fact that the fingers D on one roller enter the straw at the time that the fingers on the next roller are leaving it, thereby stripping the straw off the descending fingers, which are also curved, as shown, for the purpose of facilitating this action.

There are various ways by which the rollers A may be caused to revolve; but we think that the mechanism indicated in Figs. 1 and 2 will be found preferable for accomplishing the purpose specified. In these figures, E represents the shaft by which the driving-pulley is fixed, and which shaft, through its pulley, may be connected to the shaft of the cylinder B by means of a belt or otherwise. This driving shaft E constitutes the spindle of the second roller A, and its opposite end, which is exposed in Fig. 2, has a crank, F, connected to it. The spindles or shafts of each of the other rollers A are provided with similar cranks, G, which are all connected together on one side by means of the rod H, as shown, and on the other or driving side of the machine by the loop-rod I. The loop in this latter rod, I, is made for the purpose of permitting the said rod I to move freely without interfering with the shaft E.

From this description it will be seen that when the driving-shaft E is caused to revolve in the desired direction the crank F will also revolve, and, as it is connected to the crank G by means of the rod H, all the other cranks G revolve at the same time, including the crank J, which is fixed to the spindle of the first roller on the driving side of the machine and connects with the looped rod I, as indicated. Consequently the said looped rod I conveys the power to the cranks G on its side of the machine.

What we claim as our invention is—

1. The combination, with the frame and rollers journaled therein, as described, of the drive-shaft E, forming the spindle of one of said rollers, crank F on one end of said shaft and pivotally connected with all the spindles on that side of the machine, and the rod I, formed with a loop through which the drive-shaft passes, and pivotally connected with the spindles of said rollers, substantially as described.

2. The combination, with the frame and the rollers A, journaled therein, as described, of the drive-shaft E, forming the spindle of one of said rollers, crank F, connected to one end of said shaft, like cranks on the corresponding end of the spindles of the other rollers, the rod H, connecting said cranks, the cranks J and G on the opposite end of the spindles of said rollers, and the looped rod I, connecting said cranks J and G, substantially as described.

Brampton, November 9, 1886.

WILLIAM MOGRIDGE.
WILLIAM GIBERSON.

In presence of—
B. F. JUSTIN,
J. E. STERLING.